US007733903B2

(12) United States Patent
Bhogal et al.

(10) Patent No.: US 7,733,903 B2
(45) Date of Patent: Jun. 8, 2010

(54) TEXT TRANSCRIPTIONS FOR VOICE COMMUNICATIONS

(75) Inventors: Kulvir Singh Bhogal, Fort Worth, TX (US); Gregory Jensen Boss, American Fork, UT (US); Rick Allen Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 11/462,392

(22) Filed: Aug. 4, 2006

(65) Prior Publication Data

US 2008/0045198 A1    Feb. 21, 2008

(51) Int. Cl.
*H04J 3/16*    (2006.01)

(52) U.S. Cl. .................. 370/466; 342/32; 340/961; 455/431; 701/14; 701/120; 701/301

(58) Field of Classification Search .............. 370/328, 370/466, 574; 342/29, 34, 38, 455; 340/574; 701/120, 14, 301; 704/E15.045
See application file for complete search history.

(56) References Cited

U.S. PATENT DOCUMENTS

| | | | | |
|---|---|---|---|---|
| 4,196,474 A | * | 4/1980 | Buchanan et al. | 701/301 |
| 4,454,510 A | * | 6/1984 | Crow | 342/32 |
| 5,416,705 A | * | 5/1995 | Barnett | 701/14 |
| 5,714,948 A | * | 2/1998 | Farmakis et al. | 340/961 |
| 6,044,323 A | * | 3/2000 | Yee et al. | 701/120 |
| 6,683,541 B2 | | 1/2004 | Staggs et al. | |
| 2002/0143553 A1 | | 10/2002 | Migdol et al. | |
| 2004/0254691 A1 | | 12/2004 | Subelet | |
| 2006/0046715 A1 | * | 3/2006 | Burgemeister | 455/431 |
| 2007/0189328 A1 | * | 8/2007 | Judd | 370/466 |

OTHER PUBLICATIONS

Pattersson, et al.; Ambiguities, Awareness and Economy: A study of Emergency Service Work; CSCW'02, Nov. 16-20, 2002, New Orleans, Louisiana, USA; pp. 286-295.
Fisher, et al.; Exploratory Sequential Data Analysis: Exploring continuous Observational Data; Interactions, Mar. 1996; pp. 25-34.

* cited by examiner

*Primary Examiner*—Huy D Vu
*Assistant Examiner*—Joey Bednash
(74) *Attorney, Agent, or Firm*—Schmeiser, Olsen & Watts; William E. Schiesser (57) ABSTRACT

A method and system for converting a voice communication to a text transcription. The method comprises receiving by a computing system in a control command center, a first transmission identifier from a vehicle. The first transmission identifier identifies the vehicle. The computing system receives voice communication data for the vehicle from a user in the control command center. A software application within the computing system converts the voice communication data into text data. The computing system transmits the voice communication data, a first copy of the text data and a second transmission identifier to the vehicle. The second transmission identifier identifies the control command center. The computing system receives a confirmation request from the vehicle to confirm if the text data comprises correct information related to the voice communication data. The confirmation request is displayed on a video monitor system. The computing system transmits confirmation data to the vehicle.

44 Claims, 7 Drawing Sheets

TEXT TRANSCRIPTIONS FOR VOICE COMMUNICATIONS

TECHNICAL FIELD

The present invention relates to a method and associated system for providing a text transcript for voice communications between a vehicle and a command center.

BACKGROUND OF THE INVENTION

Communications between parties are typically difficult to understand. Accordingly, there exists a need in the art to overcome the deficiencies and limitations described herein above.

SUMMARY OF THE INVENTION

The present invention provides a method, comprising:

receiving, by a computing system in a control command center, a first transmission identifier from a vehicle, said first transmission identifier identifying said vehicle, said computing system comprising a video monitor system;

receiving, by said computing system, voice communication data from a user in said control command center, said voice communication data for said vehicle;

converting, by a software application within said computing system, said voice communication data into text data;

transmitting to vehicle, by said computing system, said voice communication data, a first copy of said text data, and a second transmission identifier, said second transmission identifier identifying said control command center;

receiving from said vehicle, by said computing system, a confirmation request to confirm if said text data comprises correct information related to said voice communication data, said confirmation request displayed on said video monitor system; and transmitting, by said computing system, confirmation data to said vehicle.

The present invention provides a method, comprising:

sending, by a computing system in a vehicle, a first transmission identifier to a control command center, said transmission identifier identifying said vehicle;

receiving from said control command center, by said computing system, voice communication data, a first copy of text data related to said voice communication data, and a second transmission identifier, said second transmission identifier identifying said control command center;

requesting, by said computing system, confirmation data to confirm if said first copy comprises correct information related to said voice communication data; and receiving, by said computing system, said confirmation data from said control command center.

The present invention provides a computing system in a control command center, said computing system comprising a processor coupled to a computer-readable memory unit, said memory unit comprising instructions that when executed by the processor implement a communication method, said method comprising;

receiving, by said computing system, a first transmission identifier from a vehicle, said first transmission identifier identifying said vehicle, said computing system comprising a video monitor system;

receiving, by said computing system, voice communication data from a user in said control command center, said voice communication data for said vehicle;

converting, by a software application within said computing system, said voice communication data into text data;

transmitting to vehicle, by said computing system, said voice communication data, a first copy of said text data, and a second transmission identifier, said second transmission identifier identifying said control command center;

receiving from said vehicle, by said computing system, a confirmation request to confirm if said text data comprises correct information related to said voice communication data, said confirmation request displayed on said video monitor system; and transmitting, by said computing system, confirmation data to said vehicle.

The present invention provides a computer program product, comprising a computer usable medium comprising a computer readable program code embodied therein, said computer readable program code comprising an algorithm adapted to implement a communication method within a computing system in located in a control command center, said method comprising:

receiving, by said computing system, a first transmission identifier from a vehicle, said first transmission identifier identifying said vehicle, said computing system comprising a video monitor system;

receiving, by said computing system, voice communication data from a user in said control command center, said voice communication data for said vehicle;

converting, by a software application within said computing system, said voice communication data into text data;

transmitting to vehicle, by said computing system, said voice communication data, a first copy of said text data, and a second transmission identifier, said second transmission identifier identifying said control command center;

receiving from said vehicle, by said computing system, a confirmation request to confirm if said text data comprises correct information related to said voice communication data, said confirmation request displayed on said video monitor system; and transmitting, by said computing system, confirmation data to said vehicle.

The present invention provides a process for integrating computing infrastructure, comprising integrating computer-readable code into a computing system in located in a control command center, wherein the code in combination with the server system is capable of performing a communication method comprising:

receiving, by said computing system, a first transmission identifier from a vehicle, said first transmission identifier identifying said vehicle, said computing system comprising a video monitor system;

receiving, by said computing system, voice communication data from a user in said control command center, said voice communication data for said vehicle;

converting, by a software application within said computing system, said voice communication data into text data;

transmitting to vehicle, by said computing system, said voice communication data, a first copy of said text data, and a second transmission identifier, said second transmission identifier identifying said control command center;

receiving from said vehicle, by said computing system, a confirmation request to confirm if said text data comprises correct information related to said voice communication data, said confirmation request displayed on said video monitor system; and transmitting, by said computing system, confirmation data to said vehicle.

The present invention advantageously provides a method and associated system capable of enhancing communications between parties.

BEST MODE FOR CARRYING OUT THE INVENTION

Figure 1:
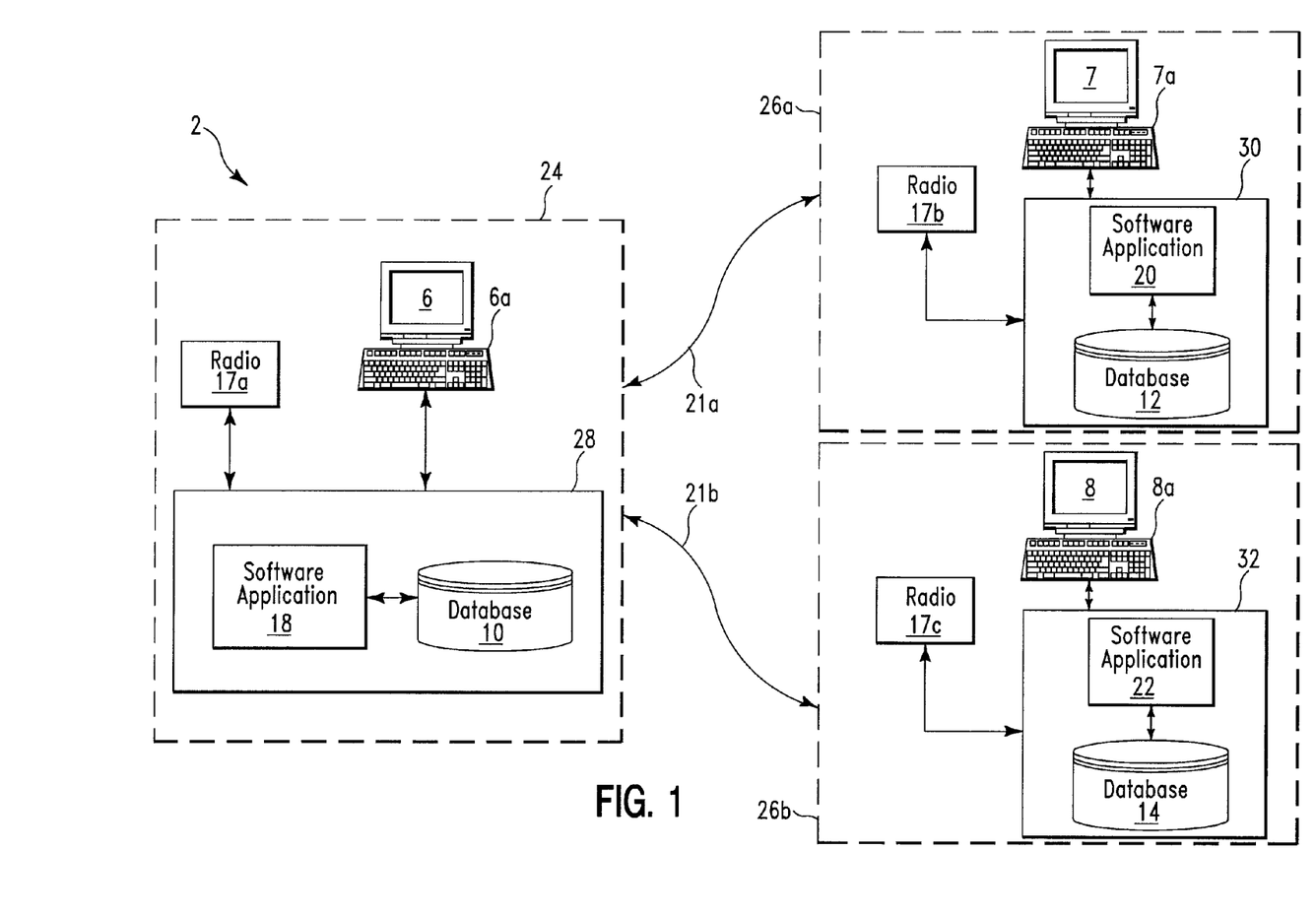
FIG. 1 illustrates a block diagram view of a voice transcription system 2 for communications between an aircraft and an air traffic control (ATC) center, in accordance with embodiments of the present invention.

FIG. 1 illustrates a block diagram view of a voice transcription system 2 for communications between an aircraft 26a and/or 26b and an air traffic control (ATC) center 24, in accordance with embodiments of the present invention. Although system 2 is described with respect to text transcriptions for communications between an aircraft 26a and/or 26b and an ATC center 24, note that system 2 is applicable to text transcriptions for communications between any type of vehicle and any type of command center directing the vehicle. For example, system 2 may be used to provide text transcriptions for communications between an emergency vehicle (e.g., police car, ambulance, fire vehicle, etc.) and a dispatch command center, communications between a taxi cab and a and a dispatch command center, communications between a boat or ship and a coast guard command center, etc. System 2 provides the ability for pilots navigating aircraft (e.g., aircraft 26a and/or 26b) to visually and verbally receive and confirm/accept instructions and/or commands to and from an ATC center (e.g., ATC center 24). Additionally, system 2 provides a filtered text transcription interface (i.e., through monitors 7 and 8) that visually sorts out relevant conversation (e.g., communications or commands between ATC center 24 and communicating aircraft 26a) into a first portion of a video display (e.g., monitor 7 and 8) and irrelevant conversation (e.g., communications between ATC center 26 and aircraft 26b) into a second portion of the video display. Additionally, the relevant conversation (e.g., communications or commands between ATC center 24 and communicating aircraft 26a) may be allocated to a first portion of a video display (e.g., monitor 7 and 8) and irrelevant conversation (e.g., communications between ATC center 26 and aircraft 26b) along with the relevant conversation may be allocated into a second portion of the video display. Alternatively, the communications may be filtered between independent video displays. The aforementioned filtering process may be applied through the use of unique sub-audible continuous tone coded squelch system (CTCSS) signal to identify an aircraft for communications. The pilot (i.e., for the communicating aircraft) and ATC personnel may confirm both sent and received speech-to-text translations through the interface.

System 2 comprises ATC center 24 and aircraft 26a and 26b. ATC center 24 communicates with aircraft 26a over a wireless connection 21a. ATC center 24 communicates with aircraft 26b over a wireless connection 21b. Aircraft 26a and 26b may be any type of aircraft including, inter alia, an airplane, a helicopter, a hot air balloon, a blimp, etc. ATC center comprises a computing system 28 connected to a video monitor 6, a keyboard 6a, and a two way radio 17a. Aircraft 26a comprises a computing system 30 connected to a video monitor 7, a keyboard 7a, and a two way radio 17b. Aircraft 26b comprises a computing system 32 connected to a video monitor 8, a keyboard 8a, and a two way radio 17a. Computing system 28 comprises a software application 18 (i.e., for generating text transcriptions from voice communications provided through two way radio 17a) and a database 10 (i.e., for recording and saving text transcriptions). Computing system 30 comprises a software application 20 (i.e., for generating text transcriptions from voice communications provided through two way radio 17b) and a database 12 (i.e., for recording and saving text transcriptions). Computing system 30 comprises a software application 22 (i.e., for generating text transcriptions from voice communications provided through two way radio 17c) and a database 14 (i.e., for recording and saving text transcriptions).

The following description for voice to text transcription of communication between ATC center 24 and aircraft 26a is also applicable for voice to text transcription of communication between ATC center 24 and aircraft 26b. When aircraft 26a flies into air space governed by ATC center 24, aircraft 26a transmits (i.e., using two way radio 17b) a first identifier (i.e., data identifying aircraft 26a) to ATC center 26. The first identifier may be transmitted automatically or manually in response to a pilot (i.e., for aircraft 26a) command. The first identifier may be stored and retrieved from database 12. The first identifier may comprise data identifying a transponder in aircraft 26a. Alternatively, the first identifier may comprise a continuous tone coded squelch system (CTCSS) signal. In response to the first identifier, a person (e.g., an air traffic controller) in ATC center 24 issues a voice command (i.e., audio data) through two way radio 17a for aircraft 26a. The voice command comprises a command for aircraft 26a to follow (e.g., a command to maintain a specified height, a command to descend, etc.). The voice command is converted into text data by software application 18 (e.g., software application 18 may comprise speech recognition software). The text data may be saved in database 10 for future reference. A copy of the text data, the voice command (i.e., audio data), and a second identifier for the ATC center 24 is transmitted via two way radio 17a to aircraft 26a. The second identifier may be stored and retrieved from database 10. The second identifier comprises a unique identification tag for ATC center 24 (e.g., a squawk identifier) so that aircraft 26a may verify which ATC center is issuing the command. Alternatively, the second identifier may comprise a continuous tone coded squelch system (CTCSS) signal. The text data, voice command (i.e., the audio data), and second identifier for ATC center 24, is received by aircraft 26a via two way radio 17b. The voice command is amplified (i.e., by two way radio 17b) and made audible for a pilot of aircraft 26a to audibly receive the command. The copy of the text data and the identifier for ATC center 24 is displayed on monitor 7 (or a portion of monitor 7) for the pilot of aircraft 26a to visually receive the command and identify ATC center 24. The pilot of aircraft 26a may accept or decline the command (i.e., described in detail with respect to FIG. 5). If the command is accepted by the pilot of aircraft 26a, the pilot may request verification that the command is correct (i.e., that the voice command has been accurately converted into equivalent text). Additionally, the pilot may request verification that a portion of the command is correct. For example, if the command is as follows "aircraft 1 climb to 370", the pilot may request verification that "370" is correct. The request for verification that the command is correct may be made by making an audible request into two way radio 17b. The audible request is converted to verification text data by software application 20 (e.g., speech recognition software) and the verification text data is sent to ATC center 24. The verification text data is displayed on monitor 6 for the person (e.g., an air traffic controller) in ATC center 24 to view. Alternatively, the request for verification that the command is correct may be made by entering a code (i.e., data) through keyboard 7a or by touching monitor 7 (i.e., if monitor 7a is a touch screen monitor) in a location where the text data (i.e., for the command from ATC center 24) is displayed. The request for verification is sent to ATC center 24 and displayed on monitor 6 for the person (e.g., an air traffic controller) in ATC center 24 to view. The request for verification displayed on monitor 6 may comprise the text data (or copy of the text data, a copy of a portion of the text data, etc) for the command originally sent from ATC center 24. In this case, the air traffic controller in ATC center 24 may view the text data (or copy of the text data) to read and determine if the original command (i.e., issued by voice) is correct. If the air traffic controller in ATC center 24 determines that the original command is correct then confirmation data may be transmitted back to aircraft 26a. Transmitting the confirmation data may comprise sending a copy of the text data (or portion of the text data) for the command originally sent from ATC center 24 to aircraft 26a. The copy of the text data will be displayed on monitor 7 in aircraft 26a for the pilot to view. The copy of the text data or portion of the text data displayed on display 7 indicates to the pilot that the command is correct. Alternatively, the confirmation data may comprise data sent to aircraft 26a that will cause a modified property for the original text data or portion of the text data (i.e., for the command) displayed on monitor 7. For example, the confirmation data may cause the original text data or portion of the original text to be displayed on monitor 7 with, inter alia, a different color, a different font, a different size, a different location on monitor 7, etc. If the air traffic controller in ATC center 24 determines that the original command is not correct then a new command may be verbally issued, converted to text, and transmitted to aircraft 26a as described, supra.

Figure 2:
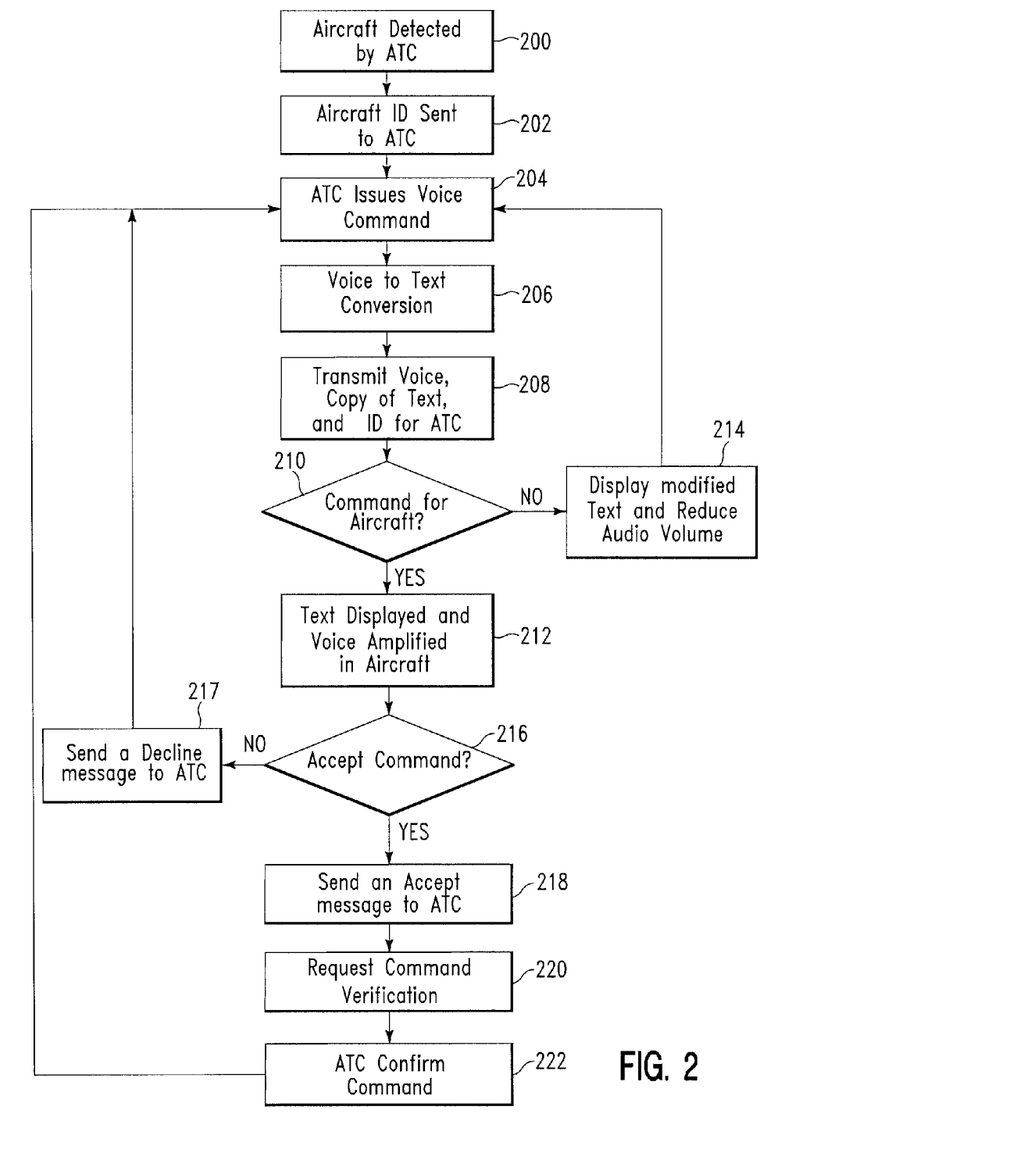
FIG. 2 is a flowchart illustrating an algorithm for implementing voice transcription system of FIG. 1, in accordance with embodiments of the present invention.

FIG. 2 is a flowchart illustrating an algorithm for implementing voice transcription system 2 of FIG. 1, in accordance with embodiments of the present invention. In step 200, an aircraft 26a enters air space governed by ATC center 24 and is detected (e.g., by radar, an RF signal, etc) by ATC center 24. In step 202, aircraft 26a transmits (i.e., using two way radio 17b) a first identifier (i.e., data identifying aircraft 26a) to ATC center 26. In step 204, a person (e.g., an air traffic controller) in ATC center 24 issues a voice command (i.e., audio data) through two way radio 17a for aircraft 26a. The voice command comprises a command for aircraft 26a to follow (e.g., a command to maintain a specified height, a command to descend, etc.). In step 206, the voice command is converted into text data (i.e., by software application 18). The text data may be saved in database 10 for future reference. In step 208, a copy of the text data, the voice command (i.e., the audio data), the first identifier, and a second identifier for the ATC center 24 is transmitted via two way radio 17a to aircraft 26a. The second identifier comprises a unique Identification tag for ATC center 24 (e.g., a squawk identifier) so that aircraft 26a may verify which ATC center is issuing the command. The text data, voice command (i.e., the audio data), and second identifier for ATC center 24, is received by aircraft 26a via two way radio 17b. In step 210, computing system 30 determines if the text data and audio data is meant for aircraft 26a. The determination may be made by determining that the first identifier sent back to aircraft 26a comprises an ID (e.g., the first identifier) identifying aircraft 26a.

If in step 210, computing system 30 determines that the text data and audio data sent from ATC center 24 is not for aircraft 26a, then in step 214 the text data is displayed on monitor 7 in aircraft 26a in a format (e.g., the text data may be displayed on monitor 7 in a specified color, font, size, location, etc) that indicates to the pilot for aircraft 26a that the text data and audio data is not for aircraft 26a and step 204 is repeated so that a command for aircraft 26a may be retrieved. Additionally in step 214, audio data may be amplified for the pilot at a reduced volume (e.g., as background audio) to indicate that audio data is not for aircraft 26a. Step 214 enables the pilot for aircraft 26a to monitor conversations between other aircrafts and ATC center 24.

If in step 210, computing system 30 determines that the text data and audio data sent from ATC center 24 is for aircraft 26a, then in step 212 the text data is displayed on monitor 7 in aircraft 26a in a specified format (e.g., the text data may be displayed on monitor 7 in a specified color, font, size, location, etc) that indicates to the pilot for aircraft 26a that the text data and audio data is for aircraft 26a. Additionally, audio data may be amplified for the pilot at a specified volume (e.g., as a main audio signal) to indicate that audio data is for aircraft 26a.

Figure 5:
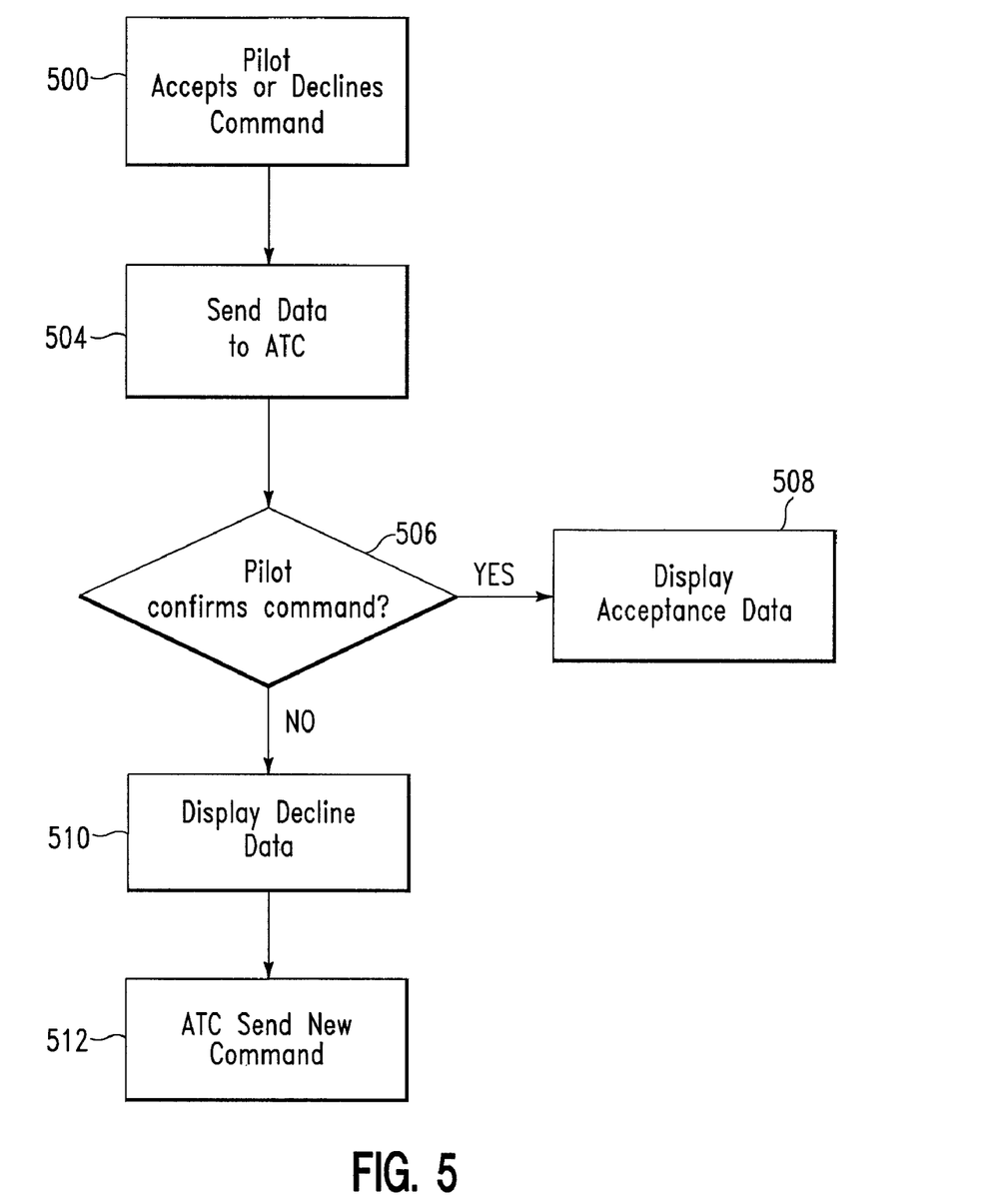
FIG. 5 is a flowchart illustrating an algorithm detailing a third set of steps for the algorithm of FIG. 2, in accordance with embodiments of the present invention.

In step 216, the pilot of aircraft 26a may accept or decline the command (i.e., described in detail with respect to FIG. 5). If in step 216, the command is not accepted (i.e., declined), then in step 217, a decline message is sent to ATC center 24 (and displayed on monitor 6) and step 204 is repeated so that another command for aircraft 26a may be retrieved.

If in step 216, the command is accepted, then in step 218, an acceptance message is sent to ATC center 24 to verify that the command is accepted. The acceptance message is displayed on monitor 6. In step 220, the pilot requests verification that the command is correct (i.e., the audio data has been accurately converted into text data). The request for verification that the command is correct may be made by making an audible request into two way radio 17b. The audible request is converted to verification text data by software application 20 (e.g., speech recognition software) and the verification text data is sent to ATC center 24. The verification text data is displayed on monitor 6 for the person (e.g., an air traffic controller) in ATC center 24 to view. Alternatively, the request for verification that the command is correct may be made by entering a code (i.e., data) through keyboard 7a or by touching monitor 7 (i.e., if monitor 7a is a touch screen monitor) in a location where the text data (i.e., for the command from ATC center 24) is displayed. The request for verification is sent to ATC center 24 and displayed on monitor 6 for the person (e.g., an air traffic controller) in ATC center 24 to view. The request for verification displayed on monitor 6 may comprise the text data (or copy of the text data) for the command originally sent from ATC center 24. In this case, the air traffic controller in ATC center 24 may view the text data (or copy of the text data) to read and determine if the original command is correct. In step 222, the air traffic controller or computing system 28 in ATC center 24 either determines that the original command is correct or incorrect. If the original command is determined to be correct then confirmation data indicating that the command is correct may be transmitted back to aircraft 26a and step 204 is repeated so that another command for aircraft 26a may be retrieved. Transmitting the confirmation data may comprise sending a copy of the text data for the command originally sent from ATC center 24 to aircraft 26a. The copy of the text data will be displayed on monitor 7 in aircraft 26a for the pilot to view. The copy of the text data displayed on display 7 indicates to the pilot that the command is correct. Alternatively, the confirmation data may comprise data sent to aircraft 26a that will cause a modified property for the original text data (i.e., for the command) displayed on monitor 7. For example, the confirmation data may cause the original text data to be displayed on monitor 7 with, inter alia, a different color, a different font, a different size, a different location on monitor 7, etc. If the original command is determined to be incorrect then step 204 is repeated so that a new command for aircraft 26a may be issued.

Figure 3:
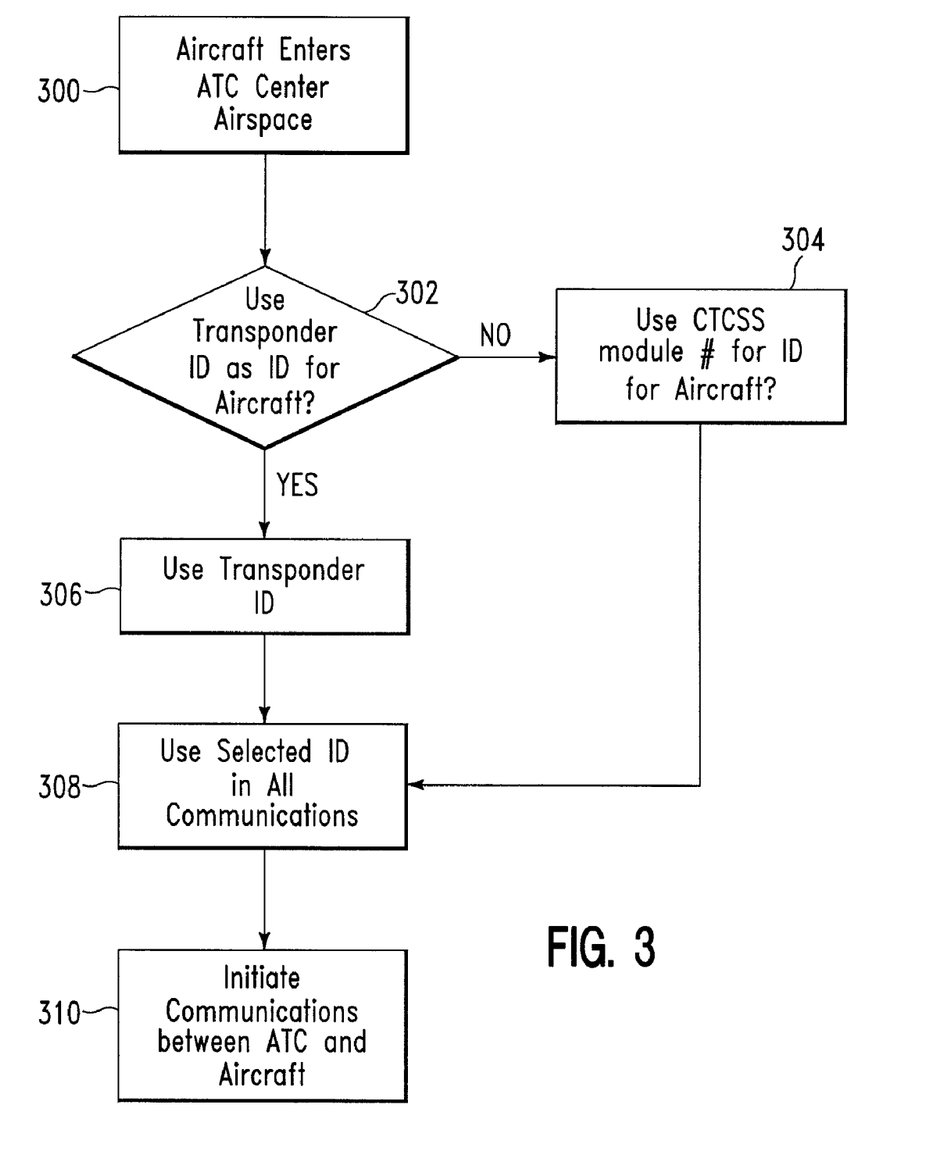
FIG. 3 is a flowchart illustrating an algorithm detailing a first set of steps for the algorithm of FIG. 2, in accordance with embodiments of the present invention.

FIG. 3 is a flowchart illustrating an algorithm detailing steps 200 and 202 of FIG. 2, in accordance with embodiments of the present invention. In step 300, aircraft 26a enters air space governed by ATC center 24 and is detected (e.g., by radar, an RF signal, etc) by ATC center 24. In step 302, a determination is made (i.e., by a pilot for aircraft 26a or computing system 30) if a transponder identification number (i.e., for a transponder located within aircraft 26a) will be used as an identification number for aircraft 26a. If in step 302, it is determined that the transponder identification number will not be used as an identification number for aircraft 26a, then in step 304 a determination is made to use a CTCSS module number to identify aircraft 26a and in step 308, the CTCSS module number is applied to all communications between ATC center 24 and aircraft 26a. If in step 302, it is determined that the transponder identification number will be used as an identification number for aircraft 26a, then the transponder identification number is selected in step 306. In step 308, the transponder identification number is applied to all communications between ATC center 24 and aircraft 26a. In step 310, communications between ATC center 24 and aircraft 26a are initiated.

Figure 4:
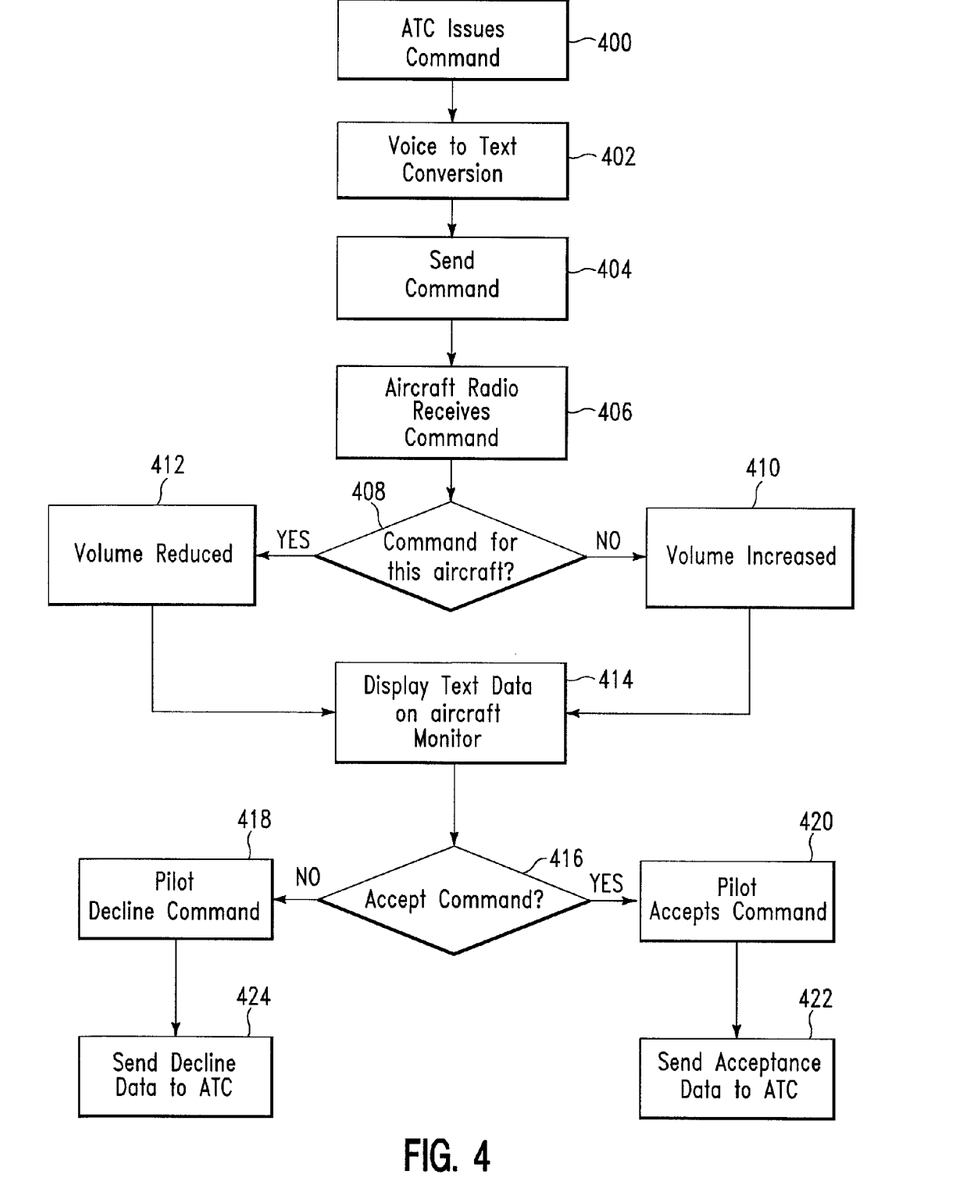
FIG. 4 is a flowchart illustrating an algorithm detailing a second set of steps for the algorithm of FIG. 2, in accordance with embodiments of the present invention.

FIG. 4 is a flowchart illustrating an algorithm detailing steps 204-212 of FIG. 2, in accordance with embodiments of the present invention. In step 400, ATC center 24 issues a voice command for aircraft 26a. In step 402, the voice command is converted into text data (i.e., by software application 18). In step 404, a copy of the text data, the voice command (i.e., audio data), a first identifier for aircraft 26a (i.e., determined in the flowchart of FIG. 3), and a second identifier for the ATC center 24 is transmitted to aircraft 26a. In step 406, the text data, voice command (i.e., the audio data), first identifier, and second identifier for ATC center 24 is received by aircraft 26a. In step 408, computing system 30 determines if the text data and audio data is for aircraft 26a. The determination may be made by determining that the first identifier sent back to aircraft 26a identifies aircraft 26a.

If in step 408, computing system 30 determines that the text data and audio data sent from ATC center 24 is not for aircraft 26a, then in step 412 the audio data is amplified for the pilot of aircraft 26a at a reduced volume (e.g., as background audio) to indicate that audio data is not for aircraft 26a. In step 414, the text data is displayed on monitor 7 in aircraft 26a in a format (e.g., the text data may be displayed on monitor 7 in a specified format (e.g., the text data may be displayed on monitor 7 in a specified color, font, size, location on monitor, etc) that indicates to the pilot for aircraft 26a that the text data is not for aircraft 26a.

If in step 408, computing system 30 determines that the audio data is for aircraft 26a then the audio data is amplified for the pilot at a specified volume (e.g., as a main audio signal) to indicate that audio data is for aircraft 26a. In step 414, the text data is displayed on monitor 7 in aircraft 26a in a format (e.g., the text data may be displayed on monitor 7 in a specified color, font, size, location, etc) that indicates to the pilot for aircraft 26a that the text data is for aircraft 26a.

In step 416, computing system 30 or the pilot for aircraft 26a determines if the command will be accepted. If in step 416, the pilot determines that the command will be accepted then in step 420, the pilot enters acceptance data (e.g., a code entered through keyboard 7a) and in step 422, the acceptance data is sent to ATC center 24. If in step 416, the pilot determines that the command will not be accepted then in step 418, the pilot enters decline data (e.g., a code entered through keyboard 7a) and in step 424, the decline data is sent to ATC center 24.

FIG. 5 is a flowchart illustrating an algorithm further detailing steps 216-218 of FIG. 2, in accordance with embodiments of the present invention. In step 500, the pilot for aircraft 26a accepts or declines the command. In step 504, data confirming acceptance or declining of the command is sent via computing system 30 and two way radio 17b to ATC center 24. The data confirming acceptance or declining of the command comprises text data (i.e., decline data or acceptance data) and identification data identifying ATC center 24. In step 506, computing system 28 determines if the command was accepted or declined. If in step 506, computing system 28 determines that the command was accepted, then in step 508 the acceptance data is displayed on monitor 6 to illustrate acceptance of the command. If in step 506, computing system 28 determines that the command was declined, then in step 510 the decline data is displayed on monitor 6 to illustrate a decline of the command. In step 512, ATC center 24 sends a new command to aircraft 26a.

Figure 6:
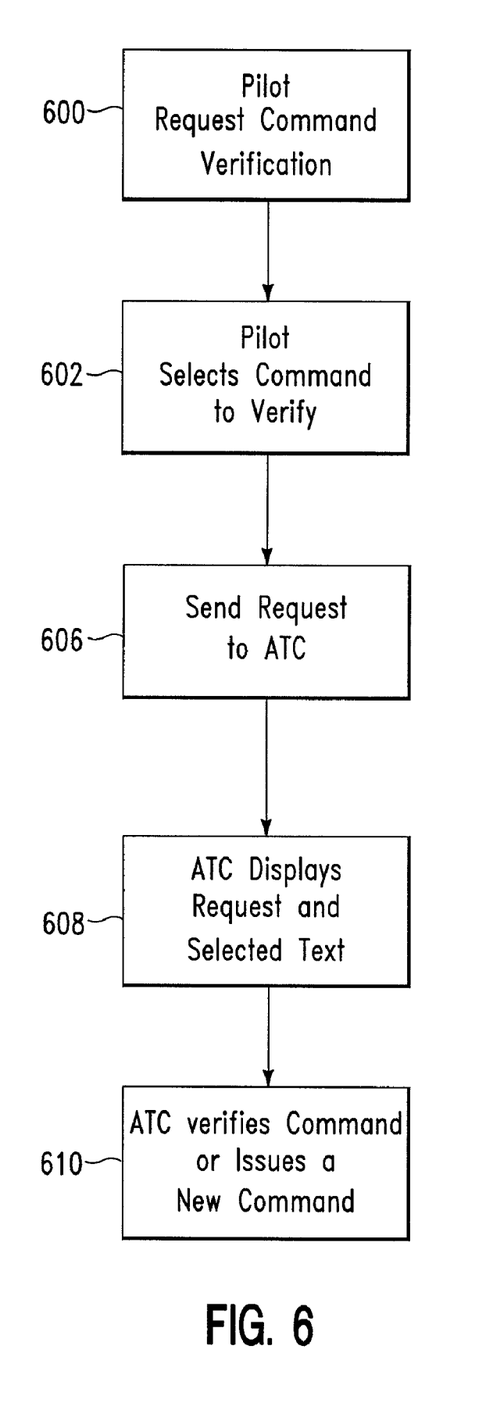
FIG. 6 is a flowchart illustrating an algorithm detailing a fourth set of steps for the algorithm of FIG. 2, in accordance with embodiments of the present invention.

FIG. 6 is a flowchart illustrating an algorithm detailing steps 220-222 of FIG. 2, in accordance with embodiments of the present invention. In step 600, the pilot for aircraft 26a requests verification that the issued command from ATC center 24 is correct (i.e., the audio data has been accurately converted into text data). In step 602, the pilot selects a command to verify. For example, there may be many issued commands displayed on monitor 7 so the pilot must select one command to verify. The selection may be made by, inter alia, highlighting (i.e., on monitor 7) the selected command for verification. In step 606, the request and selected text is sent to ATC center 24. In step 608, the request and selected text is displayed on monitor 6 for viewing by a person in ATC center 24. In step 610, if the command is correct, ATC center 24 verifies the command by sending verification data to aircraft 26a. Alternatively, if the command is incorrect, ATC center 24 may issue a new command for aircraft 26a.

Figure 7:
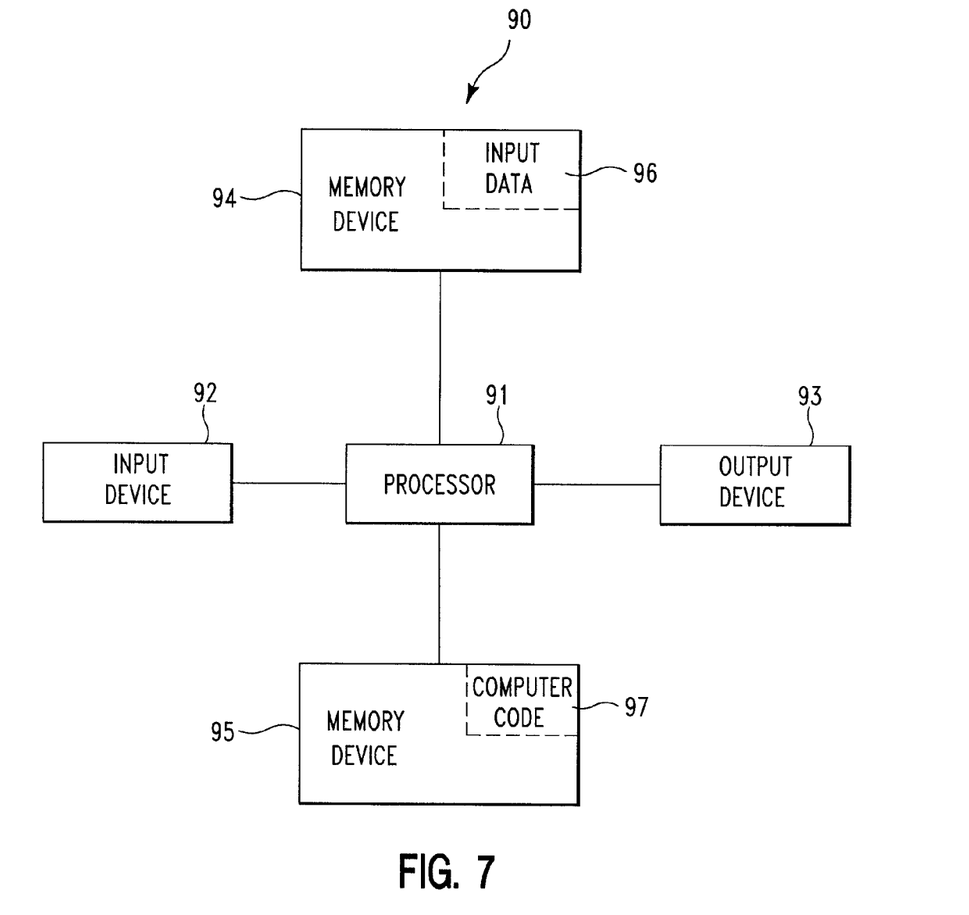
FIG. 7 illustrates a computer system used for voice to text transcriptions for communications between an aircraft and an air traffic control center, in accordance with embodiments of the present invention.

FIG. 7 illustrates a computer system 90 (i.e., computing systems 28, 30, and 32 in FIG. 1) used for voice to text transcriptions for communications between an aircraft and an air traffic control center, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for voice to text transcriptions for communications between an aircraft and an air traffic control center. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithms of FIGS. 2-6 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to provide voice to text transcriptions for communications between an aircraft and an air traffic control center. Thus the present invention discloses a process for deploying or integrating computing infrastructure, comprising integrating computer-readable code into the computer system 90, wherein the code in combination with the computer system 90 is capable of performing a method for voice to text transcriptions for communications between an aircraft and an air traffic control center. In another embodiment, the invention provides a business method that performs the process steps of the invention on a subscription, advertising, and/or fee basis. That is, a service provider, such as a Solution Integrator, could offer to synchronize and display text associated with an audio/video performance. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   receiving, by a computing system in a control command center, a first transmission identifier from a first vehicle, said first transmission identifier identifying said first vehicle, said computing system comprising a video monitor system, said computing system comprising a database;
   receiving, by said computing system, a third transmission identifier from a second vehicle, said third transmission identifier identifying said second vehicle;
   receiving, by said computing system, first voice communication data from a user in said control command center, said first voice communication data comprising a specific message for said first vehicle;
   receiving, by said computing system, second voice communication data from said user in said control command center, said second voice communication data comprising a specific message for said second vehicle;
   converting, by a software application within said computing system, said first voice communication data into first text data;
   storing, by said computing system in said database, said first text data;
   converting, by said software application, said second voice communication data into second text data;
   storing, by said computing system in said database, said second text data;
   transmitting to said first vehicle, by a computer processor of said computing system, said first voice communication data and a second transmission identifier, said second transmission identifier identifying said control command center;
   transmitting to said first vehicle, a first copy of said first text data;
   transmitting to said first vehicle, a first copy of said second text data;
   filtering between a first video display device in said first vehicle and a second video display device in said first vehicle, said first copy of said first text data and said first copy of said second text data such that said first copy of said first text data is displayed on said first video display device and said first copy of said second text data is displayed on said second video display device, wherein said first video display device is independent from said second video display device;
   receiving from said first vehicle, by said computing system, a confirmation request to confirm if a portion of said first text data comprises correct information related to said first voice communication data, said confirmation request comprising text displayed on said video monitor system, wherein said portion of said first text data does not comprise an entire portion of said first text data, wherein said first display device comprises a touch screen monitor, and wherein said confirmation request is enabled by touching said portion of said text data on said first display device; and
   transmitting, by said computing system, confirmation data to said first vehicle, wherein said confirmation data confirms that said portion of said first text data comprises correct information related to said first voice communication data, and wherein said confirmation data comprises a copy of said portion of said first text data.

2. The method of claim 1, further comprising saving, by said computing system, said first text data.

3. The method of claim 1, wherein said confirmation data confirms that said first text data comprises said correct information.

4. The method of claim 1, wherein said confirmation data confirms that said first text data does not comprise said correct information.

5. The method of claim 1, wherein said confirmation data comprises a second copy of said first text data.

6. The method of claim 1, wherein said confirmation data comprises data for changing a format of said first copy of said first text data.

7. The method of claim 1, wherein said first transmission identifier comprises identification data for a transponder located in said first vehicle.

8. The method of claim 1, wherein said first transmission identifier and said second transmission identifier each comprise a continuous tone coded squelch system (CTCSS) identification number.

9. The method of claim 1, wherein said control command center is an air traffic control command center, and wherein said first vehicle is an aircraft.

10. The method of claim 1, wherein said first display device comprises a touch screen monitor, and wherein said confirmation request is enabled by touching said portion of said text data on said first display device.

11. The method of claim 1, further comprising:
reproducing said second voice communication data at a second audible level; and
reproducing said first voice communication data at a first audible level differing from said second audible level.

12. The method of claim 1, wherein copy of said portion of said first text data is displayed on said first display device in a font that differs from an original font of said portion of said first text data.

13. A method, comprising:
sending, by a computer processor of a computing system in a first vehicle, a first transmission identifier to a control command center, said first transmission identifier identifying said first vehicle, said computing system comprising a database;
receiving from said control command center, by said computing system, first voice communication data associated with a user in said control command center, a first copy of first text data related to said first voice communication data, and a second transmission identifier, said second transmission identifier identifying said control command center;
receiving from said control command center, by said computing system, a first copy of second text data related to second voice communication data from a second vehicle;
storing, by said computing system in said database, said first copy of first text data and said first copy of second text data;
filtering between a first video display device in said first vehicle and a second video display device in said first vehicle, said first copy of said first text data and said first copy of said second text data;
displaying on said first video display in said first vehicle, said first copy of said first text data;
displaying on said second video display in said first vehicle, said first copy of said second text data, wherein said first video display device is independent from said second video display device;
requesting, by said computing system, confirmation data comprising text to confirm if a portion of said first copy of said first text data comprises correct information related to said first voice communication data, wherein said portion of said first copy of said first text data does not comprise an entire portion of said first copy of said first text data, wherein said first display device comprises a touch screen monitor, and wherein said requesting is enabled by touching said portion of said first copy of said text data on said first display device; and
receiving, by said computing system, said confirmation data from said control command center, wherein said confirmation data confirms that said portion of said first copy of said first text data comprises correct information related to said first voice communication data, and wherein said confirmation data comprises a copy of said portion of said first text data.

14. The method of claim 13, wherein said confirmation data confirms that said first text data comprises said correct information.

15. The method of claim 13, wherein said confirmation data confirms that said first text data does not comprise said correct information.

16. The method of claim 13, wherein said confirmation data comprises a second copy of said first text data.

17. The method of claim 13, wherein said method further comprises:
changing, by said confirmation data, a format of said first copy of said first text data displayed on said first video display device.

18. The method of claim 17, wherein said format comprises a format selected from the group consisting of a color of said text data displayed on said video monitor system, a font size of said text data displayed on said video monitor system, and a location where said text data is displayed on said video monitor system.

19. The method of claim 13, wherein said first transmission identifier comprises identification data for a transponder located in said first vehicle.

20. The method of claim 13, wherein said first transmission identifier and said second transmission identifier each comprise a continuous tone coded squelch system (CTCSS) signal identification number.

21. The method of claim 13, wherein said control command center is an air traffic control command center, and wherein said first vehicle is an aircraft.

22. A computing system in a control command center, said computing system comprising a computer processor coupled to a computer-readable memory unit, said memory unit comprising a database and instructions that when executed by the computer processor implement a communication method, said method comprising;
receiving, by said computing system, a first transmission identifier from a first vehicle, said first transmission identifier identifying said first vehicle, said computing system comprising a video monitor system;
receiving, by said computing system, a third transmission identifier from a second vehicle, said third transmission identifier identifying said second vehicle;
receiving, by said computing system, first voice communication data from a user in said control command center, said first voice communication data comprising a specific message for said first vehicle;
receiving, by said computing system, second voice communication data from said user in said control command center, said second voice communication data comprising a specific message for said second vehicle;
converting, by a software application within said computing system, said first voice communication data into first text data;
storing, by said computing system in said database, said first text data;
converting, by said software application, said second voice communication data into second text data;

storing, by said computing system in said database, said second text data;

transmitting to said first vehicle, by said computer processor, said first voice communication data and a second transmission identifier, said second transmission identifier identifying said control command center;

transmitting to said first vehicle, a first copy of said first text data;

transmitting to said first vehicle, a first copy of said second text data;

filtering between a first video display device in said first vehicle and a second video display device in said first vehicle, said first copy of said first text data and said first copy of said second text data such that said first copy of said first text data is displayed on said first video display device and said first copy of said second text data is displayed on said second video display device, wherein said first video display device is independent from said second video display device;

receiving from said first vehicle, by said computing system, a confirmation request to confirm if a portion of said first text data comprises correct information related to said first voice communication data, said confirmation request comprising text displayed on said video monitor system, wherein said portion of said first text data does not comprise an entire portion of said first text data, wherein said first display device comprises a touch screen monitor, and wherein said confirmation request is enabled by touching said portion of said text data on said first display device; and transmitting, by said computing system, confirmation data to said first vehicle, wherein said confirmation data confirms that said portion of said first text data comprises correct information related to said first voice communication data, and wherein said confirmation data comprises a copy of said portion of said first text data.

23. The computing system of claim 22, wherein said method further comprises:

saving, by said computing system, said first text data.

24. The computing system of claim 22, wherein said confirmation data confirms that said first text data comprises said correct information.

25. The computing system of claim 22, wherein said confirmation data confirms that said first text data does not comprise said correct information.

26. The computing system of claim 22, wherein said confirmation data comprises a second copy of said first text data.

27. The computing system of claim 22, wherein said confirmation data comprises data for changing a format of said first copy of said first text data.

28. The computing system of claim 22, wherein said first transmission identifier comprises identification data for a transponder located in said first vehicle.

29. The computing system of claim 22, wherein said first transmission identifier and said second transmission identifier each comprise a continuous tone coded squelch system (CTCSS) signal identification number.

30. The computing system of claim 22, wherein said control command center is an air traffic control command center, and wherein said first vehicle is an aircraft.

31. A computer program product, comprising a computer readable medium comprising a database and a computer readable program code embodied therein, said computer readable program code comprising an algorithm adapted to implement a communication method within a computing system is located in a control command center, said method comprising:

receiving, by said computing system, a first transmission identifier from a first vehicle, said first transmission identifier identifying said first vehicle, said computing system comprising a video monitor system;

receiving, by said computing system, a third transmission identifier from a second vehicle, said third transmission identifier identifying said second vehicle;

receiving, by said computing system, first voice communication data from a user in said control command center, said first voice communication data comprising a specific message for said first vehicle;

receiving, by said computing system, second voice communication data from said user in said control command center, said second voice communication data comprising a specific message for said second vehicle;

converting, by a software application within said computing system, said first voice communication data into first text data;

storing, by said computing system in said database, said first text data;

converting, by said software application, said second voice communication data into second text data;

storing, by said computing system in said database, said second text data;

transmitting to said first vehicle, by a computer processor of said computing system, said first voice communication data and a second transmission identifier, said second transmission identifier identifying said control command center;

transmitting to said first vehicle, a first copy of said first text data;

transmitting to said first vehicle, a first copy of said second text data;

filtering between a first video display device in said first vehicle and a second video display device in said first vehicle, said first copy of said first text data and said first copy of said second text data such that said first copy of said first text data is displayed on said first video display device and said first copy of said second text data is displayed on said second video display device, wherein said first video display device is independent from said second video display device;

receiving from said first vehicle, by said computing system, a confirmation request to confirm if a portion of said first text data comprises correct information related to said first voice communication data, said confirmation request comprising text displayed on said video monitor system, wherein said portion of said first text data does not comprise an entire portion of said first text data, wherein said first display device comprises a touch screen monitor, and wherein said confirmation request is enabled by touching said portion of said text data on said first display device; and transmitting, by said computing system, confirmation data to said first vehicle, wherein said confirmation data confirms that said portion of said first text data comprises correct information related to said first voice communication data, and wherein said confirmation data comprises a copy of said portion of said first text data.

32. The computer program product of claim 31, wherein said method further comprises:

saving, by said computing system, said first text data.

33. The computer program product of claim 31, wherein said confirmation data confirms that said first text data comprises said correct information.

34. The computer program product of claim 31, wherein said confirmation data confirms that said first text data does not comprise said correct information.

35. The computer program product of claim 31, wherein said confirmation data comprises a second copy of said first text data.

36. The computer program product of claim 31, wherein said confirmation data comprises data for changing a format of said first copy of said first text data.

37. The computer program product of claim 31, wherein said first transmission identifier comprises identification data for a transponder located in said first vehicle.

38. The computer program product of claim 31, wherein said first transmission identifier and said second transmission identifier each comprise a continuous tone coded squelch system (CTCSS) signal identification number.

39. The computer program product of claim 31, wherein said control command center is an air traffic control command center, and wherein said first vehicle is an aircraft.

40. A process for integrating computing infrastructure, comprising integrating computer-readable code into a computing system located in a control command center, wherein said computing system comprises a database, and wherein the code in combination with the computing system is capable of performing a communication method comprising:

receiving, by said computing system, a first transmission identifier from a first vehicle, said first transmission identifier identifying said first vehicle, said computing system comprising a video monitor system;

receiving, by said computing system, a third transmission identifier from a second vehicle, said third transmission identifier identifying said second vehicle;

receiving, by said computing system, first voice communication data from a user in said control command center, said first voice communication data comprising a specific message for said first vehicle;

receiving, by said computing system, second voice communication data from said user in said control command center, said second voice communication data comprising a specific message for said second vehicle;

converting, by a software application within said computing system, said first voice communication data into first text data;

storing, by said computing system in said database, said first text data;

converting, by said software application, said second voice communication data into second text data;

storing, by said computing system in said database, said second text data;

transmitting to said first vehicle, by a computer processor of said computing system, said first voice communication data and a second transmission identifier, said second transmission identifier identifying said control command center;

transmitting to said first vehicle, a first copy of said first text data;

transmitting to said first vehicle, a first copy of said second text data;

filtering between a first video display device in said first vehicle and a second video display device in said first vehicle, said first copy of said first text data and said first copy of said second text data such that said first copy of said first text data is displayed on said first video display device and said first copy of said second text data is displayed on said second video display device, wherein said first video display device is independent from said second video display device;

receiving from said first vehicle, by said computing system, a confirmation request to confirm if a portion of said first text data comprises correct information related to said first voice communication data, said confirmation request comprising text displayed on said video monitor system, wherein said portion of said first text data does not comprise an entire portion of said first text data, wherein said first display device comprises a touch screen monitor, and wherein said confirmation request is enabled by touching said portion of said text data on said first display device; and transmitting, by said computing system, confirmation data to said first vehicle, wherein said confirmation data confirms that said portion of said first text data comprises correct information related to said first voice communication data, and wherein said confirmation data comprises a copy of said portion of said first text data.

41. The process of claim 40, wherein said method further comprises:

saving, by said computing system, said first text data.

42. The process of claim 40, wherein said confirmation data confirms that said first text data comprises said correct information.

43. The process of claim 40, wherein said confirmation data confirms that said first text data does not comprise said correct information.

44. The process of claim 40, wherein said confirmation data comprises a second copy of said first text data.

\* \* \* \* \*